April 5, 1927.  H. C. LOGAN  1,623,693
INTERCHANGEABLE EMBLEM
Filed March 19, 1926
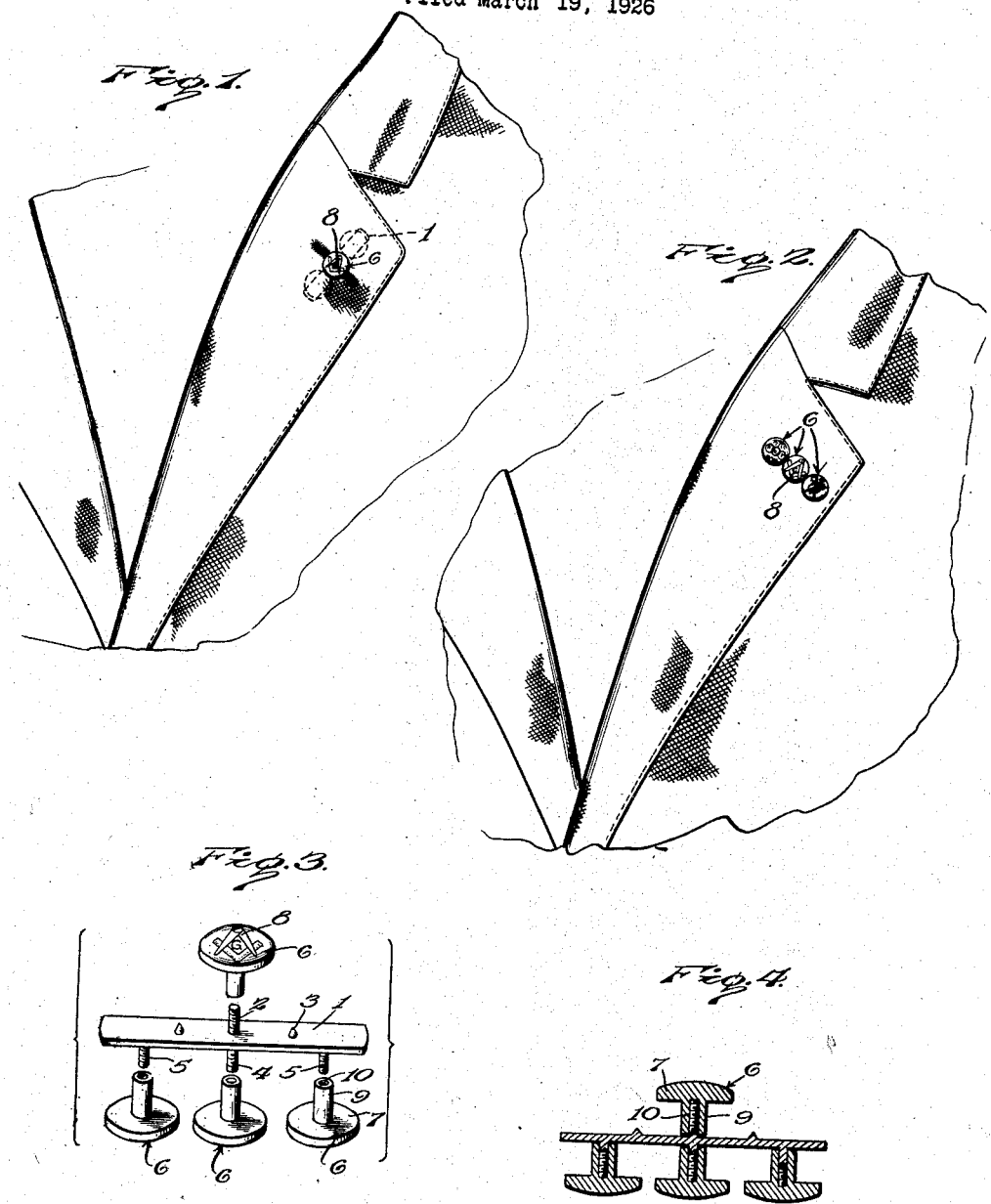
Inventor
H. C. Logan
By Lacy & Lacy, Attorneys Patented Apr. 5, 1927.

1,623,693

UNITED STATES PATENT OFFICE.

HARRY C. LOGAN, OF PORTLAND, OREGON.

INTERCHANGEABLE EMBLEM.

Application filed March 19, 1926. Serial No. 95,965.

This invention relates to emblems of the type which are worn upon coat lapels and has as its primary object to provide an interchangeable emblem or, in other words, one so constructed that component parts thereof may be interchanged or substituted one for another to permit the wearer of the emblem to display one or more of the insignia bearing members thereof, as for example, when attending different lodges or societies.

Another object of the invention is to provide an emblem of the interchangeable type above referred to, so constructed that there will be no likelihood of disarrangement of the same when once applied to the coat lapel and properly adjusted.

Another object of the invention is to so construct the interchangeable emblem that one or more of the emblem members will constitute the means necessary to secure the emblem as a whole in position upon the coat lapel, such emblem member or members being the one or ones which are not intended to be displayed.

In the accompanying drawings:

Figure 1 is a view in elevation of the emblem embodying the invention arranged upon a coat lapel and illustrating the arrangement of the emblem when one emblem member alone is to be displayed.

Figure 2 is a view similar to Figure 1, illustrating the arrangement of the emblem when two or three of the emblem bearing members are to be displayed.

Figure 3 is a perspective view illustrating the component parts of the emblem relatively separated.

Figure 4 is a longitudinal sectional view through the emblem with the parts thereof assembled.

The emblem comprises a body member which is indicated by the numeral 1 and comprises a flat and relatively narrow bar of metal or other suitable material and upon one side this bar is provided at a point midway between its ends, with a threaded stud indicated by the numeral 2, and, at opposite sides of the stud or, in other words, between the stud and the opposite ends of the bar, with spurs indicated by the numeral 3. The bar is provided upon its opposite side with a threaded stud 4 which is located opposite the stud 2 and in axial alinement therewith, and with other threaded studs 5 located near the ends of the bar and equi-distantly spaced from the stud 4.

The emblem members heretofore referred to are indicated in general by the numeral 6 and each of these members comprises a head 7 which may be of the circular form shown in the drawings or of any other desired marginal contour and the head 7 of each of these members bears the insignia of an order or society indicated by the numeral 8. Each of the members 6 has a tubular shank 9 upon its rear side and the said shank is interiorly threaded as indicated by the numeral 10, so that the shank of any one of the members may be fitted to any one of the studs 2, 4 and 5, upon the bar 1. The threaded studs and the interiorly threaded shanks constitute a very convenient means for interchangeably connecting the members 6 with the bar 1, but any other conventional means may be employed for the purpose, so long as said members are interchangeably connectable with the bar or body member.

Assuming that the wearer of the emblem is a member of four orders, fraternities, societies or the like, he may, at the time of purchasing the emblem, select the corresponding emblem members and, if he prefers to display but one emblem, he will permit the three remaining emblem members to remain upon the studs 4 and 5 onto which they have been threaded and will then dispose the bar 1 against the rear side of the lapel of his coat with the stud 2 projecting through the buttonhole, and will then thread the shank of the selected emblem member onto said stud so that the shank will extend through the buttonhole and the rear side of the head will engage the front of the coat lapel, this arrangement being clearly shown in Figure 1 of the drawings. When the emblem is so arranged the spurs 3 will engage the material of the coat lapel at the rear side thereof above and below the buttonhole so that there can be no rotative displacement of the device as a whole. If the wearer should desire to display two or three of the emblems he will select the corresponding emblem members and apply them to the studs 4 and 5, the said studs having been previously inserted through the buttonhole with the bar 1 extending in alinement with the said buttonhole at the rear side of the coat lapel, the remaining emblem member being permitted to remain upon the stud 2, this arrangement being shown in Figure 2. Where two of the emblems alone are to be displayed, one of the emblem members which is threaded onto the respective stud 5 is permitted to remain in position and the bar 1 is disposed against the rear side of the coat lapel with the stud 4 and the other stud 5 projecting through the buttonhole, and the two selected emblem members are then threaded onto these studs, the bar 1 being so positioned that either the stud 4 or the last mentioned stud 5 will engage the adjacent end of the buttonhole so as to prevent any displacement of the emblem as a whole.

From the foregoing, it will be evident that a wide range of choice in the selection of emblems to be worn and displayed is permitted by reason of the construction of the emblem as a whole and that whether one or more of the emblem members are exposed to view, the device will not be liable to become disarranged.

Having thus described the invention, what I claim is:

1. An interchangeable emblem comprising a body member having anchoring elements upon its opposite sides, and emblem members interchangeably connectable with said elements.

2. An interchangeable emblem comprising a body member having threaded studs upon its opposite sides, and emblem members having threaded sockets adapting the said members to be interchangeably connected with said studs.

3. An interchangeable emblem comprising a body member having an anchoring element upon one of its sides and spurs at the opposite sides of the said anchoring element, the said member having spaced anchoring elements upon its other side, and emblem members interchangeably connectable with said elements.

4. An interchangeable emblem comprising a bar, a threaded stud projecting from one side of the bar between the ends thereof, spurs projecting from the said side of the bar at opposite sides of the stud, threaded studs projecting from the other side of the bar, and emblem members comprising heads and interiorly threaded shanks, the said members being interchangeably connectable with the said studs.

5. A device of the character described comprising a bar having studs upon opposite sides thereof adapted to interchangeably engage the button-hole of a garment, and emblem members interchangeably engaged with the studs.

In testimony whereof I affix my signature.

HARRY C. LOGAN. [L. S.]